(12) United States Patent
Hoshino et al.

(10) Patent No.: US 7,712,180 B2
(45) Date of Patent: May 11, 2010

(54) WIPER BLADE

(75) Inventors: Takashi Hoshino, Kiryu (JP); Hiroki Tokunaka, Kiryu (JP); Junichi Sekiguchi, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 1282 days.

(21) Appl. No.: 10/548,301

(22) PCT Filed: Dec. 16, 2003

(86) PCT No.: PCT/JP03/16117

§ 371 (c)(1),
(2), (4) Date: Sep. 6, 2005

(87) PCT Pub. No.: WO2004/078541

PCT Pub. Date: Sep. 16, 2004

(65) Prior Publication Data

US 2006/0179597 A1     Aug. 17, 2006

(30) Foreign Application Priority Data

Mar. 7, 2003     (JP) ............................. 2003-060832

(51) Int. Cl.
*B60S 1/38* (2006.01)
*B60S 1/40* (2006.01)
(52) U.S. Cl. .............................. 15/250.43; 15/250.361; 15/250.201
(58) Field of Classification Search .............. 15/250.43, 15/250.201, 250.44, 250.451–250.454, 250.47, 15/250.361
See application file for complete search history.

(56) References Cited

U.S. PATENT DOCUMENTS

| 2,616,113 | A | * | 11/1952 | Scinta | 15/250.47 |
| 2,847,694 | A | * | 8/1958 | Chambers | 15/250.43 |
| 3,102,296 | A | * | 9/1963 | Wise | 15/250.451 |
| 3,195,162 | A | * | 7/1965 | Krohm | 15/250.451 |

(Continued)

FOREIGN PATENT DOCUMENTS

FR    2448460    *    9/1980

(Continued)

OTHER PUBLICATIONS

Communication under Article 94(3) EPC from European Patent Office for European Patent Application Serial No. 03 780 797.1-2424 dated Jan. 9, 2008.

(Continued)

*Primary Examiner*—Gary K Graham
(74) *Attorney, Agent, or Firm*—McCormick, Paulding & Huber LLP

(57) ABSTRACT

A wiper blade (18*a*) has a rubber holder (22) for holding a blade rubber (21). This rubber holder (22) has a connection block (24) coupled to a wiper arm and two sub-holders (25) fixed on both sides of the connection block (24), and the sub-holders (25) each has two rod-shaped spring members (27) curved with curvature radii smaller than that of a front glass and 11 holder pieces (26) fixed to these rod-shaped spring members (27) in a longitudinal direction at a predetermined interval. Further, this rubber holder (22) is formed so that the two sub-holders (25) are coupled to each other via the connection block (24) in the longitudinal direction.

1 Claim, 6 Drawing Sheets

U.S. PATENT DOCUMENTS

| | | | |
|---|---|---|---|
| 3,386,126 A * | 6/1968 | Hadekel | 15/250.47 |
| 4,976,001 A * | 12/1990 | Wright | 15/250.48 |
| 5,485,650 A | 1/1996 | Swanepoel | 15/250.43 |
| 6,301,742 B1 * | 10/2001 | Kota | 15/250.46 |
| 6,427,283 B1 * | 8/2002 | Dietrich et al. | 15/250.32 |
| 7,254,862 B2 * | 8/2007 | Hoshino | 15/250.47 |
| 2002/0053112 A1 * | 5/2002 | Ohyama | 15/250.43 |
| 2003/0033683 A1 | 2/2003 | Kotlarski | 15/250.43 |

FOREIGN PATENT DOCUMENTS

| | | |
|---|---|---|
| GB | 427 383 | 4/1935 |
| JP | 54-62247 | 5/1979 |
| JP | 6-340249 | 12/1994 |
| JP | 7-132797 | 5/1995 |
| JP | 10-6932 | 1/1998 |
| JP | 2002-500596 | 1/2002 |
| JP | 2002-225681 | 8/2002 |
| JP | 2002-532336 | 10/2002 |
| WO | 99/51472 | 10/1999 |
| WO | 00/37293 | 6/2000 |

OTHER PUBLICATIONS

European Search Report for Serial No. EP 03 78 0797 dated Mar. 30, 2006.

* cited by examiner

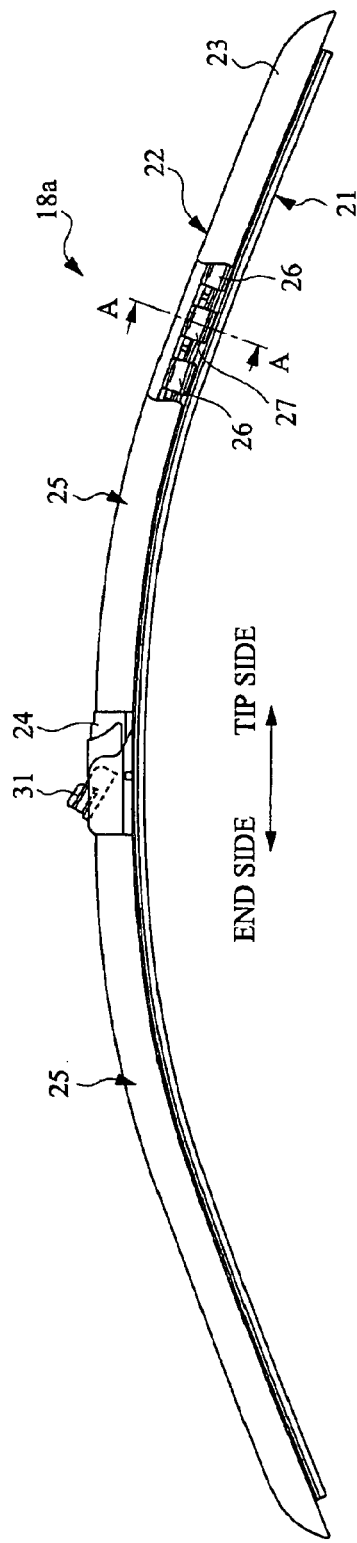
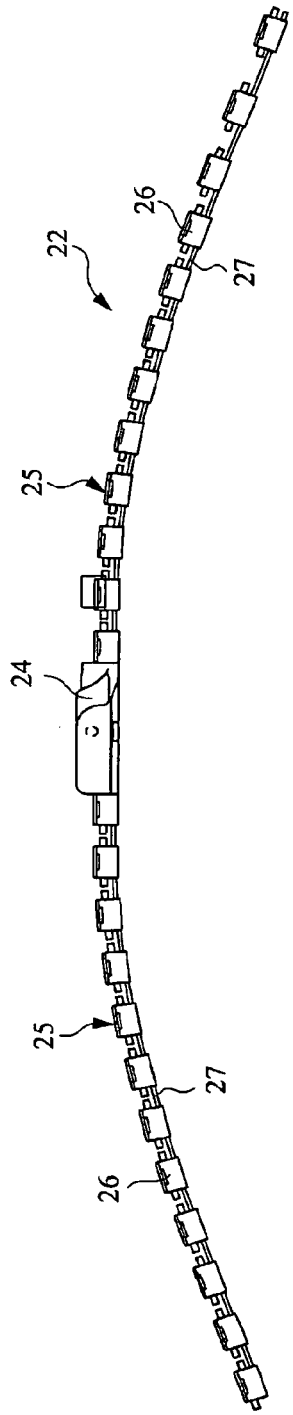
FIG. 2A
FIG. 2B

L1<L2<L3<L4

The present invention relates to a wiper blade for wiping a windshield glass face of a vehicle.

WIPER BLADE

CROSS-REFERENCE TO RELATED APPLICATIONS

This application is entitled to the benefit of and incorporates by reference essential subject matter disclosed in International Patent Application No. PCT/JP2003/016117 filed on Dec. 16, 2003 and Japanese Patent Application No. 2003-060832 filed on Mar. 7, 2003.

FIELD OF THE INVENTION

The present invention relates to a wiper blade for wiping a windshield glass face of a vehicle.

BACKGROUND OF THE INVENTION

In a vehicle such as an automobile, a wiper apparatus is provided to ensure a visual field of a driver by wiping attached matters such as rain, snow, bugs, or droplets from preceding cars, which have been adhered on a windshield glass such as a front glass. The wiper apparatus generally has a wiper arm swung by an electric motor and a wiper blade attached to a tip portion of the wiper arm, wherein a wiping operation is conducted by the wider blade reciprocating on the windshield.

As the wiper blade used in such a wiper apparatus, there has been known the wiper blade in which the blade rubber directly contacting with the front glass is directly attached to a flat leaf spring member formed of an elastic member such as a steel plate, for example, as shown in Japanese Patent Laid-Open Publication No. 6-340249. In this case, the flat leaf spring member is formed to curve at a curvature radius smaller than that of the front glass, so that the flat leaf spring member is elastically deformed by a pressing force applied from the wiper arm to disperse the pressing force in a longitudinal direction of the blade rubber.

In such a wiper blade, however, the flat leaf spring member is formed with a longitudinal dimension equal to that of the blade rubber and into a curved shape, so that when the wiper blade with a blade length of, for example, 700 mm or so is manufactured, the flat leaf spring member becomes lengthy accordingly. Therefore, it is feared that: when the flat leaf spring members are carried into a work site, their returnable boxes grow in size; due to decreasing of the packed number of them or the like, efficiency in physical distribution aspects is lowered; and when the flat leaf spring members are processed, they are deformed due to interference with a die or molding machine in some cases. That is, handling them has not been easy.

Furthermore, the windshield glasses provided to the vehicles often have different curvatures depending on types of the vehicles due to their design or the like. In contrast, since a distribution pressure of the blade rubber to the windshield glass is determined based on a characteristic of the flat leaf spring member in such a wiper blade, the wiper blade using the flat leaf spring member with a predetermined characteristic can generate a distribution pressure effective on only a windshield glass with a specific curvature. Accordingly, since the wiper blade using an exclusive flat leaf spring member is set for each vehicle type, it becomes necessary to prepare various kinds of flat leaf spring members different in characteristic, so that manufacturing the wiper blades different in characteristic has become complicated.

An object of the present invention is to facilitate the manufacturing of the wiper blade.

Another object of the present invention is to make it easy to manufacture the wiper blades different in characteristic.

BRIEF SUMMARY OF THE INVENTION

A wiper blade according to the present invention, which is attached to a wiper arm provided swingably to a vehicle to perform a swinging motion on a windshield glass and wipes said windshield glass, wherein a plurality of elastic members elastically deformable in a direction perpendicular to said windshield glass are each attached integrally to a blade rubber contacting with said windshield glass and are coupled in a longitudinal direction.

The wiper blade according to the present invention is such that sub-holders provided with holding portions for holding said blade rubber to said elastic members are coupled in the longitudinal direction.

The wiper blade according to the present invention is such that two of said sub-holders are coupled via a connection block connected to said wiper arm.

The wiper blade according to the present invention is such that a plurality of holding pieces respectively provided with said holding portions, and a rod-shaped spring member coupling said holding pieces in the longitudinal direction at a predetermined interval are provided to said sub-holders.

The wiper blade according to the present invention is such that elastic forces of said elastic members are made different in the longitudinal direction of said blade rubber.

A manufacturing method of a wiper blade according to the present invention, the wiper blade having a blade rubber contacting with a windshield glass and a rubber holder for holding said blade rubber and attached to a wiper arm swingably provided to a vehicle to wipe said windshield glass, comprises: a sub-holder forming step of forming a plurality of sub-holders each having a holding portion holding said blade rubber and being elastically deformable in a direction perpendicular to said windshield glass; a sub-holder coupling step of coupling said plurality of sub-holders in the longitudinal direction to form said rubber holder; and a blade-rubber attaching step of attaching said blade rubber to said rubber holder.

The manufacturing method of a wiper blade according to the present invention is such that said sub-holder forming step includes: a spring-member forming step of forming a rod-shaped spring member into a predetermined curved shape; and a holding-piece fixing step of fixing a plurality of holding pieces each having said holding portion to said rod-shaped spring member in the longitudinal direction at a predetermined interval.

According to the present invention, since the longitudinal dimension of each of the elastic members constituting the wiper blade becomes short, carrying and handling them become facilitated and the manufacturing of the wiper blade can be easily carried out.

Also, according to the present invention, since the length of the elastic member or sub-holder becomes short, the returnable box used when these members are carried during the manufacturing time is reduced in size and the packed number of them can be increased, so that the efficiency in the physical distribution aspects in manufacturing the wiper blade can be improved.

Furthermore, according to the present invention, by combining the sub-holders different in characteristic, many kinds of wiper blades different in characteristic can be manufactured easily.

BRIEF DESCRIPTION OF THE DRAWINGS

FIG. 2A is a partially broken front view showing details of a DR-side wiper blade shown in FIG. 1, and FIG. 2B is a front view showing a rubber holder shown in FIG. 2A.

DETAILED DESCRIPTION OF THE INVENTION

Figure 1:
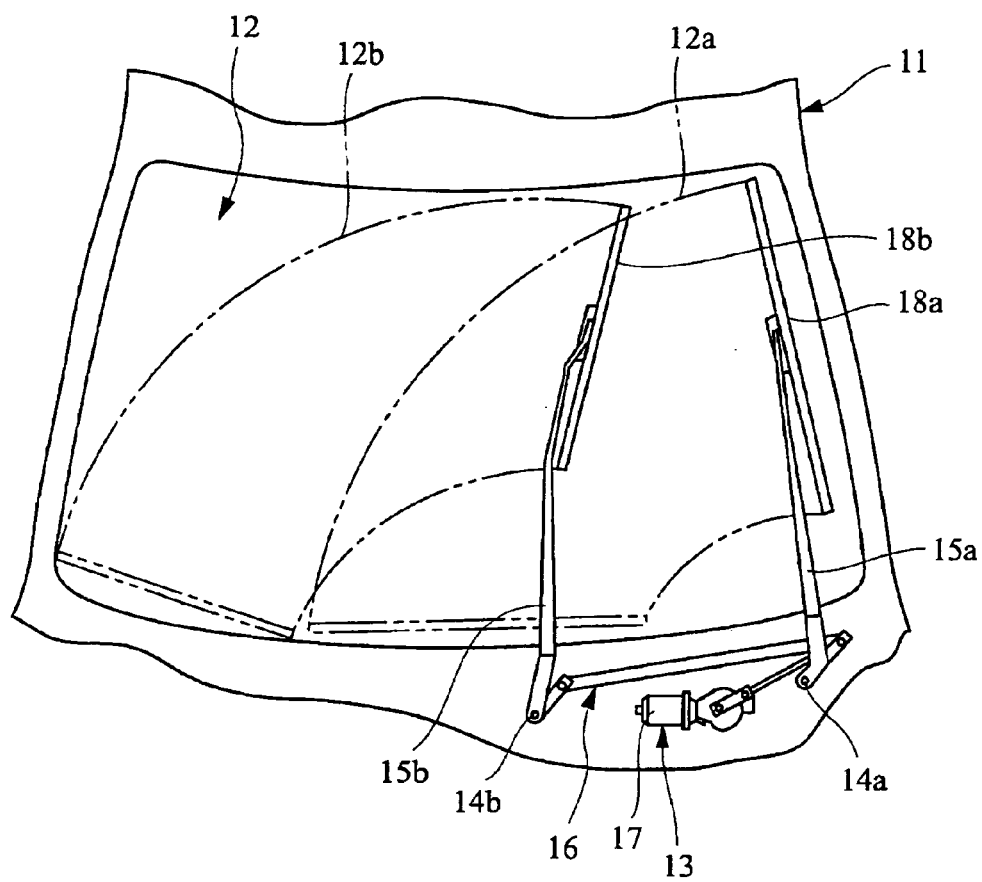
FIG. 1 is an explanatory diagram schematically showing a wiper apparatus provided with a wiper blade according to an embodiment of the present invention.

As shown in FIG. 1, a wiper apparatus 13 is provided to a vehicle 11 in order to wipe rain, droplets from preceding cars, or the like attached to a front glass 12 serving as a windshield glass and ensure a visual field for a driver.

The wiper apparatus 13 has: a driver-seat-side, i.e., DR-side wiper arm 15a, which is fixed to a wiper shaft 14a rotatably supported to the vehicle 11 and is swingably provided to the vehicle 11; and similarly a front-passenger-seat-side, i.e., AS-side wiper arm 15b, which is fixed to a wiper shaft 14b rotatably supported to the vehicle 11 and is swingably provided to the vehicle 11. These wiper shafts 14a, 14b are coupled to a wiper motor 17 via a link mechanism 16, and when the wiper motor 17 is actuated, the wiper arms 15a, 15b are swung within a predetermined angular range.

A driver-seat-side, i.e., DR-side wiper blade 18a is attached to a tip of the DR-side wiper arm 15a, and a front-passenger-seat-side, i.e., AS-side wiper blade 18b is attached to a tip of the wiper arm 15b. The respective wiper arms 15a, 15b have spring members such as springs unshown incorporated therein and the respective wiper blades 18a, 18b, to which pressing forces from the wiper arms 15a, 15b are applied, are elastically brought in contact with the front glass 12. When the wiper arms 15a, 15b swing, the wiper blades 18a, 18b perform swinging motions on the front glass 12 in wiping ranges 12a, 12b between an upper reversing position and a lower reversing position positioned at a lower end of the front glass 12, thereby wiping the front glass 12.

Thus, although the DR-side wiper blade 18a and the AS-side wiper blade 18b are provided to the vehicle 11, these wiper blades 18a, 18b have the same structure basically. Only the DR-side wiper blade 18a will be therefore explained below.

Figure 3:
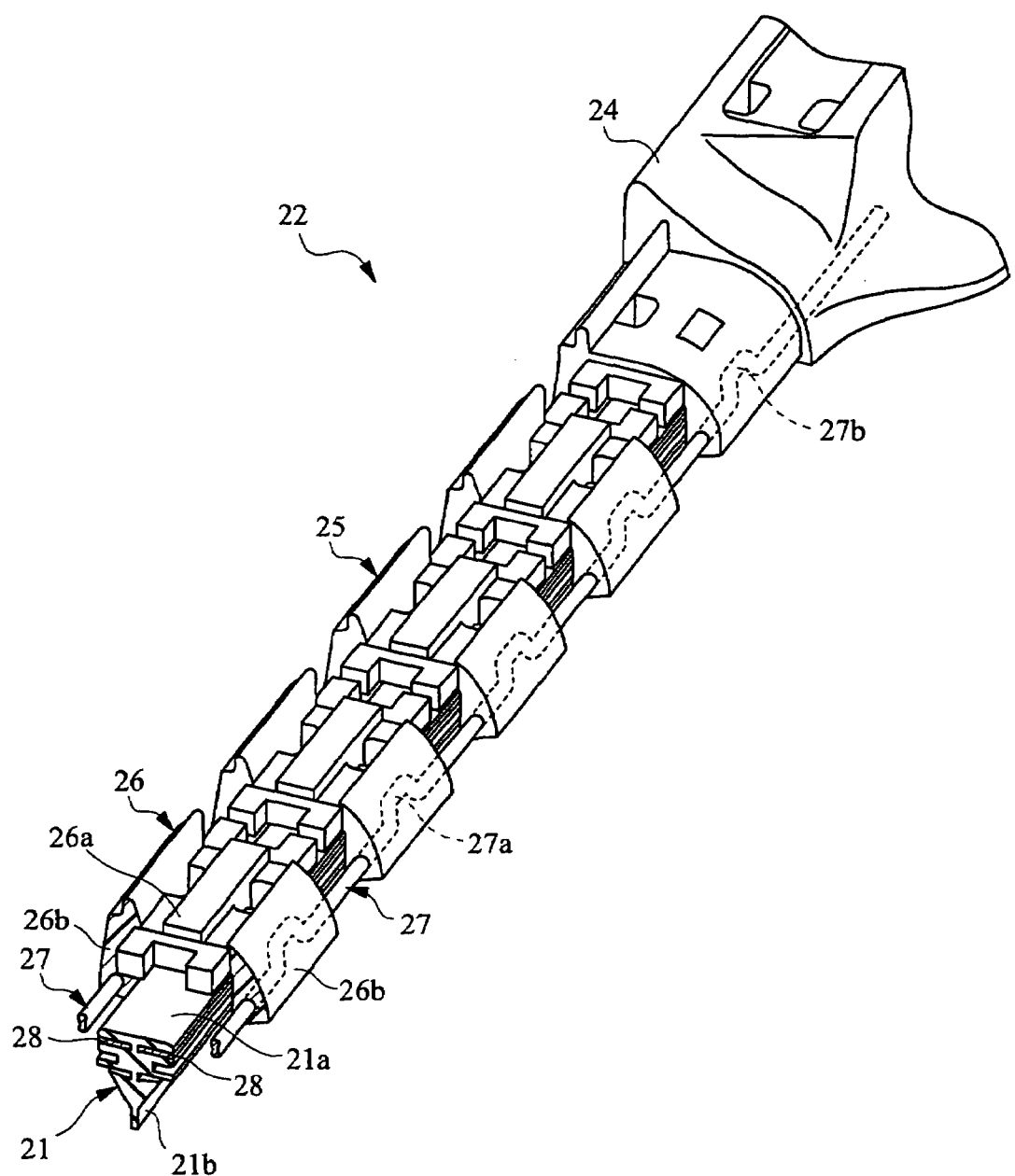
FIG. 3 is a perspective view showing details of the rubber holder shown in FIG. 2B.
Figure 4:
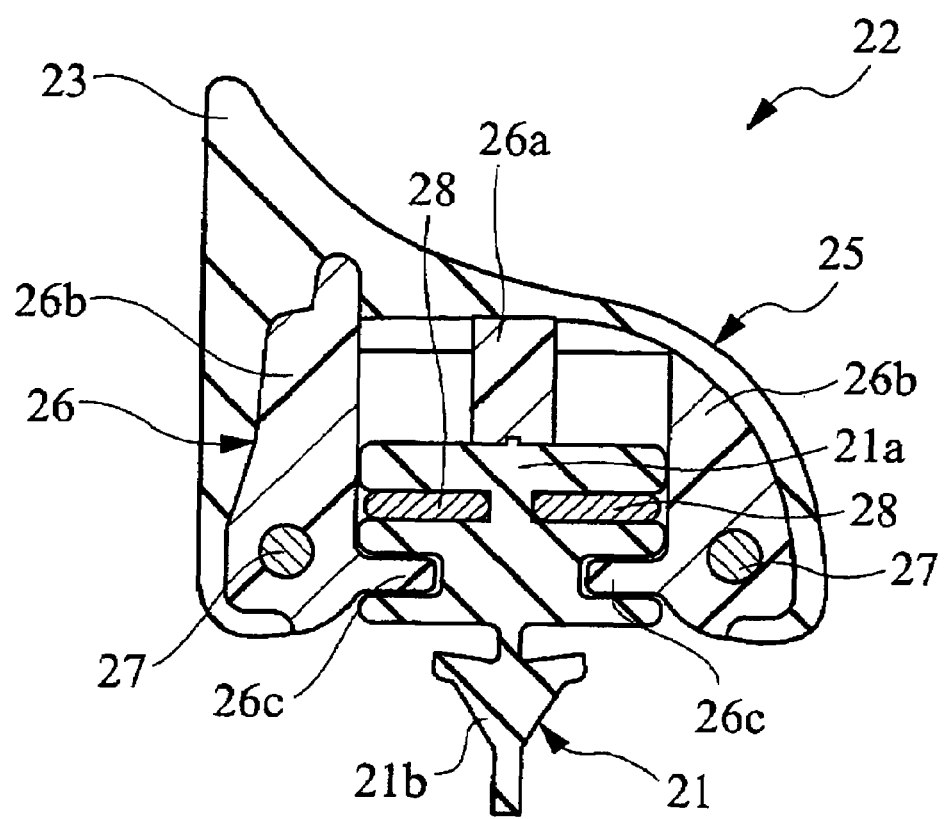
FIG. 4 is a sectional view taken along line A-A in FIG. 2A.

FIG. 2A is a partially broken front view showing details of the DR-side wiper blade shown in FIG. 1, and FIG. 2B is a front view showing the rubber holder shown in FIG. 2A. FIG. 3 is a perspective view showing details of the rubber holder shown in FIG. 2B, and FIG. 4 is a sectional view taken along A-A line in FIG. 2A.

As shown in FIG. 2A, the DR-side wiper blade 18a (hereinafter called "wiper blade 18a") has a blade rubber 21 directly contacting with the front glass 12 and a rubber holder 22 for holding this blade rubber 21, and is curved with a curvature radius smaller than the smallest curvature radius in the wiping range of the front glass 12, namely, a curvature radius at the lower reversing position, in a state in which the wiper blade is separated from the front glass 12, i.e., a natural state.

As shown in FIG. 2B, a fin 23 made of, for example, hard rubber or the like is attached to the rubber holder 22 so that air resistance thereof can be reduced. A connection block 24 is provided at an almost central portion of the rubber holder in a longitudinal direction thereof, and one side and the other side of the connection block 24 are provided with sub-holders 25, respectively.

As understood also from FIG. 3, the sub-holder 25 has a plurality of (for example in this embodiment, 11) holding pieces 26 and two rod-shaped spring members 27 serving as elastic members, and has a structure in which these holding pieces 26 are connected by the rod-shape spring members 27 at predetermined intervals in a longitudinal direction.

The holding pieces 26 are called "bridging members" or "elements", and each is formed into a C-shaped section having a base end wall portion 26a and a pair of side wall portions 26b approximately perpendicular to this base end wall portion 26a, as shown in FIG. 4. Each side wall portion 26b is provided with a holding portion 26c, and the blade rubber 21 is held by the holding portions 26c of the respective holding pieces 26.

The rod-shaped spring members 27 are formed so that their sections are each a circular and they are curved with a curvature radius smaller than that of the front glass 12, and they are arranged to be displaced in a direction of moving when the wiper blade 18a performs a wiping operation on the front glass 12, namely, in a wiping direction. As shown by one-dotted chain lines in FIG. 3, a plurality of crank portions 27a each bent in a crank fashion are formed in the rod-shaped spring members 27 at predetermined intervals, and the respective holding pieces 26 are fixed to the corresponding crank portions 27a on the side wall portions 26b. Since the holding pieces 26 are fixed by the rod-shaped spring members 27, the holding portions 26c for holding the blade rubber 21 are provided to the rod-shaped spring members 27. The holding pieces 26 are fixed to the crank portions 27a, so that the rod-shaped spring members 27 are connected to each other by the holding pieces 26 so as to have predetermined rigidity in a wiping direction and become elastically deformable in a direction perpendicular to the front glass 12. That is, the sub-holders 25 become elastically deformable in a direction perpendicular to the front glass 12 because the rod-shape spring members 27 are elastically deformed.

One of the sub-holders 25 is such that crank portions for connection 27b formed on one end sides of the rod-shaped spring members 27 are fixed to one end side of the connection block 24. The other of the sub-holders 25 is such that the crank portions for connection 27b formed on one end sides of the rod-shaped spring members 27 are fixed to the other end side of the connection block 24. Thus, the rubber holder 22 has a structure in which the two sub-holders 25 are coupled via the connection block 24 in the longitudinal direction. By coupling the sub-holders 25, the rod-shaped spring members 27 in the respective sub-holders 25 are coupled in the longitudinal direction.

Meanwhile, the blade rubber 21 has a base portion 21a and an edge portion 21b contacting with the front glass 12 to perform the wiping, and has the same shape as that of a blade rubber used in a wiper blade of a tournament type having been known since conventionally. As quality of material for the blade rubber 21, natural rubber, chloroprene rubber, or the like is used, and so as to have merits of respective materials, a material obtained by blending natural rubber and chloroprene rubber is often used. The blade rubber 21 is produced by performing an extrusion molding of these materials, and has the same sectional shape in its longitudinal direction. Vertebras 28 formed into flat plates are attached to both side face portions of the base portion 21a of the blade rubber 21, and the blade rubber 21 is such that a predetermined elastic force is applied in a direction perpendicular to the front glass 12 by the vertebras 28. The base portion 21*a* is engaged with the holding portions 26*c* of the respective holding pieces 26, so that the blade rubber 21 is held by the rubber holder 22.

A clip 31 is provided in the connection block 24, and the wiper blade 18*a* is connected to the DR-side wiper arm 15*a* by the clip 31. A pressing force from the DR-side wiper arm 15*a* is applied to the rubber holder 22 by the connection block 24. When the pressing force from the wiper arm 15*a* is applied to the connection block 24, the respective sub-holders 25 are elastically deformed in conformity with the curvature of the front glass 12, whereby the wiper blade 18*a* is deformed so that the longitudinal-entire blade rubber 21 contacts with the front glass 12. That is, the rod-shaped spring members 27 are elastically deformed, due to the pressing force from the wiper arm 15*a*, so that the rubber holder 22 follows up the curvature of the front glass 12. Reaction forces of the rod-shaped spring members 27 due to the elastic deformation are transmitted to the holding pieces 26*c*, whereby the rubber holder 22 creates a force for pressing the blade rubber 21 on the front glass 12. The vertebras 28 are attached to the blade rubber 21, so that when the pressing force of the wiper arm 15*a* is applied to the rubber holder 22, the elastic forces of the vertebras 28 are applied to the blade rubber 21 in addition to the reaction forces of the rod-shaped spring members 27. Thereby, the reaction forces of the rod-shaped spring members 27 discontinuously applied to the blade rubber 21 in the longitudinal direction are corrected by the elastic forces of the vertebras 28, so that a pressure distribution of the blade rubber 21 to the front glass 12 is uniformized in the longitudinal direction. Thus, the pressing force from the wiper arm 15*a* is dispersed by the rod-shaped spring members 27 and the vertebras 28 and applied to the blade rubber 21, and the blade rubber 21 contacts with the front glass 12 to have a predetermined distribution pressure characteristic.

Figure 5A:
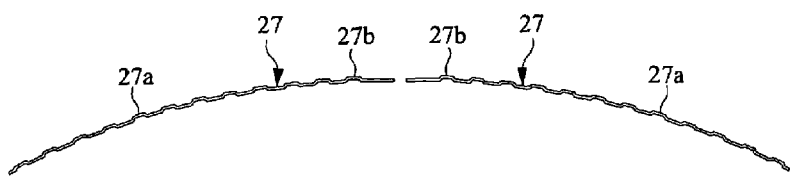
FIGS. 5A to 5D are explanatory views showing manufacturing steps of the DR-side wiper blade.
Figure 5B:
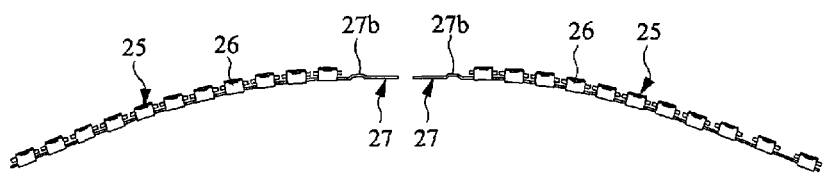
Figure 5C:
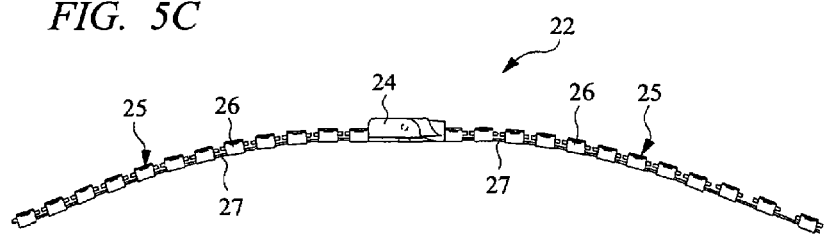
Figure 5D:
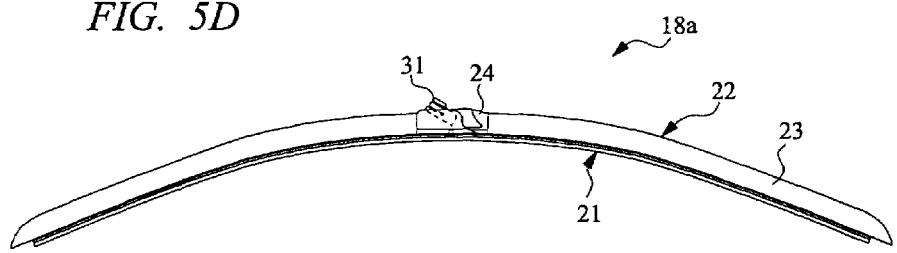
Figure 6:
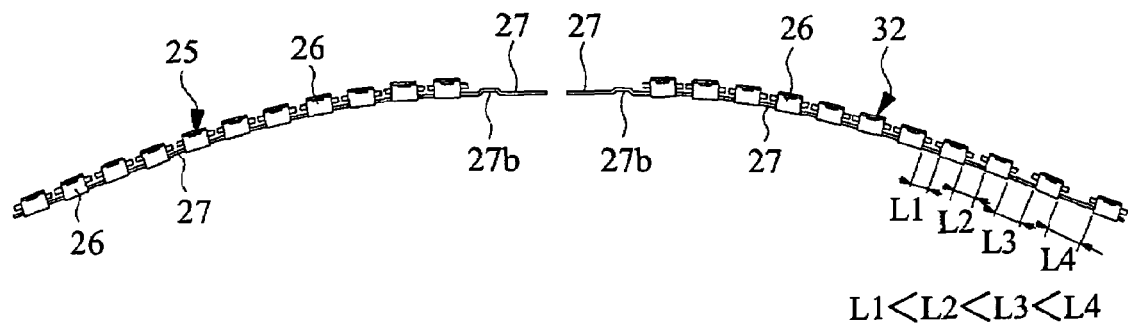
FIG. 6 is an explanatory diagram showing a combination of sub-holders different in characteristic.

FIGS. 5A to 5D are explanatory views showing manufacturing steps of the DR-side wiper blade, and FIG. 6 is an explanatory view showing a combination of the sub-holders different in characteristic.

Next, a manufacturing method for such a wiper blade 18*a* will be explained.

In a sub-holder forming step, first, the plurality of sub-holders 25 are manufactured. The sub-holder forming step includes a spring-member forming step and a holding-piece fixing step. As shown in FIG. 5A, in the spring-member forming step, the rod-shaped spring member 27 is formed into a predetermined bent shape by a pressing work and is formed into such a shape as to have the plurality of crank portions 27*a* arranged at predetermined intervals. At that time, a wire diameter or curvature radius of the rod-shape spring member 27, the number of crank portions, and the like are set depending on the specification of the wiper blade.

Next, as shown in FIG. 5B, in the holding-piece fixing step, 11 holding pieces 26 are fixed to the two rod-shaped spring members 27 at the predetermined intervals in the longitudinal direction. In this case, since the hard resin material is injection-molded into the respective crank portions 27*a* of the rod-shaped spring members 27 arranged in an unshown die, the respective holding pieces 26 are formed in a state of being fixed to the rod-shaped spring members 27. Thus, the sub-holder forming step is performed by the spring-member forming step and the holding-piece fixing step, and the sub-holders 25 are formed by these steps. The sub-holders 25 formed at this time have characteristics corresponding to those of the rod-shaped spring members 27 formed in the spring-member forming step.

Next, as shown in FIG. 5C, in a sub-holder coupling step, the two sub-holders 25 are coupled in the longitudinal direction, whereby the rubber holder 22 is formed. In this case, by arranging the two sub-holders 25 in the longitudinal direction so as to be disposed in the unshown die and by injection-molding the hard resin material into the crank portions for connection 27*b* formed at the one ends of the rod-shaped spring members 27, the connection block 24 is formed between these sub-holders 25. That is, in the sub-holder coupling step, the crank portions for connection 27*b* provided in the rod-shaped spring members 27 of the respective sub-holders 25 are both fixed to the connection block 24, so that the sub-holders 25 are coupled via the connection block 24 in the longitudinal direction.

As shown in FIG. 5D, finally, as a blade-rubber attaching step, the blade rubber 21 is assembled to the holding portions 26*c* provided to the respective holding pieces 26, and a fin 23 is fixed to an outer circumferential face of the rubber holder 22 by an adhesive, whereby the wiper blade 18*a* is completed.

Thus, in the wiper blade 18*a*, the rubber holder 22 is formed so that the two sub-holders 25 formed in the sub-holder forming step are coupled in the longitudinal direction in the sub-holder coupling step, so that the rod-shaped spring members 27 in moving from the spring-member forming step to the holding-piece fixing step and the respective sub-holders 25 in moving from the sub-holder forming step to the sub-holder coupling step can be reduced in length. Accordingly, handling of the rod-shaped spring members 27 or the sub-holders 25 in the sub-holder forming step and the sub-holder coupling step becomes easy, so that the manufacturing of the wiper blade 18*a* is made easy. Since the length of the rod-shaped spring member 27 or the sub-holder 25 becomes short, a depth of an arc due to curving becomes small, so that the handling involved in being disposed in or taken out from the die is facilitated and the rod-shaped spring member 27 and the sub-holder 25 can be prevented from being deformed by interfering with the die or molding machine.

Since the length of the rod-shaped spring member 27 or the sub-holder 25 becomes short, the returnable box used in carrying these members during a manufacturing time is reduced in size. Further, since the packed number of them can be increased, efficiency in the physical distribution aspects when the wiper blade 18*a* is manufactured can be improved.

Furthermore, in the wiper blade 18*a*, the two sub-holders 25 are coupled by the sub-holder coupling step and the rubber holder 22 is formed, so that if a plurality of sub-holders different in characteristic are manufactured in the sub-holder forming step, many kinds of rubber holders, i.e., the wiper blades different in characteristic can be manufactured easily in the sub-holder coupling step by combining these sub-holders. Incidentally, the characteristic of the wiper blade is set based upon a wire diameter, an elastic force, a curvature level or the like of the rod-shaped spring member and indicates a characteristic of a distribution pressure of the blade rubber, which occurs when the wiper blade contacts with the front glass.

For example, as shown in FIG. 6, since the same sub-holder 25 as the sub-holder 25 shown in FIG. 2B is fixed to one side of the connection block 24 and concurrently a sub-holder 32 different in characteristic from the sub-holder 25 is fixed to the other side of the connection block 24, a rubber holder different in characteristic from the rubber holder 22 can be manufactured easily. In this case, the sub-holder 32 is such that an elastic coefficient of the rod-shaped spring member 27 is made different in the longitudinal direction of the blade rubber 21 by setting the intervals L1 to L4 between the holding pieces 26 on its tip side to be gradually increased toward the tip side of the sub-holder 32, whereby the characteristic of the rubber holder can be changed. Incidentally, in FIG. 6, members corresponding to the members previously described are denoted by the same reference numerals.

Thus, in the wiper blade 18a, by combining the sub-holders 25 and 32 different in characteristic from each other, many kinds of wiper blades 18a different in characteristic can be manufactured easily.

Needless to say, the present invention is not limited to the above embodiment and can be variously modified without departing from the gist thereof. For example, in the above embodiment, the sub-holder 25 has the plurality of holding pieces 26 and the rod-shaped spring members 27 connecting these holding pieces 26 in the longitudinal direction at the predetermined intervals, but is not limited to this case and may be used as a sub-holder having the flat leaf spring member to which the blade rubber 21 can be directly attached.

According to the above embodiment, the rod-shaped spring member 27 is used for coupling the holding pieces 26 in the longitudinal direction, but is not limited to this case and the sub-holder 25 may be formed by using a plurality of elastic members that couple only the holding pieces 26 adjacent to each other. As such an elastic member, for example, a plate member or the like formed into a flat plate may be proposed.

Furthermore, in the above embodiment, the two sub-holders 25 are coupled via the connection block 24 in the longitudinal direction, but are not limited to this case and two or more sub-holders formed further short may be coupled in the longitudinal direction.

Moreover, in the above embodiment, the present invention is applied to the wiper blade 18a of the wiper apparatus 13 of a tandem type, but is not limited to this case and may be applied to the AS-side wiper blade 18b or another wiper blade used in a wiper apparatus of another type such as an opposite wiping type.

The present invention can be applied in manufacturing many kinds of wiper blades corresponding to the windshield glasses different in curvature or size.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A wiper blade attached to a wiper arm provided swingably to a vehicle to perform a swinging motion on a windshield glass and wipe said windshield glass, the wiper blade comprising:

two sub-holders coupled in a longitudinal direction via a connection block connected to said wiper arm;

wherein a plurality of holding pieces respectively provided with holding portions for holding a blade rubber, and a rod-shaped spring member coupling said plurality of holding pieces in the longitudinal direction at a predetermined interval are provided at said sub-holders;

wherein said connection block is formed by injection-molding of hard resin material; and wherein one of said sub-holders is fixed to one end side of said connection block by one end side of the rod-shaped spring member and the other of said sub-holders is fixed to the other end side of said connection block by one end side of the rod-shaped spring member.

* * * * *